United States Patent [19]

Bray

[11] Patent Number: 4,609,992
[45] Date of Patent: Sep. 2, 1986

[54] SYSTEM FOR MONITORING TORSION DAMAGE TO A COMPOSITE LINE OF SHAPES THROUGH A DRIVING MACHINE AND A DRIVEN MACHINE

[75] Inventor: Jean-Claude Bray, Belfort, France

[73] Assignee: Alsthom-Atlantique, Paris, France

[21] Appl. No.: 572,333

[22] Filed: Jan. 20, 1984

[30] Foreign Application Priority Data

Jan. 20, 1983 [FR] France ............................ 83 00843

[51] Int. Cl.⁴ ..................... G01M 7/00; G06F 15/20
[52] U.S. Cl. ..................................... 364/508; 73/577;
73/660; 73/862.27; 364/506; 364/550
[58] Field of Search ............................. 364/506–508,
364/424.1, 431.02, 550, 551; 73/488, 577, 660,
862.19, 862.27

[56] References Cited

U.S. PATENT DOCUMENTS

| 4,057,714 | 11/1977 | Fork et al. ...................... 73/862.19 |
| 4,110,829 | 8/1978 | Boys ................................ 364/508 X |
| 4,184,205 | 1/1980 | Morrow ............................. 364/508 |
| 4,437,163 | 3/1984 | Kurihara et al. .................. 364/508 |
| 4,488,240 | 12/1984 | Kepadia et al. ................... 364/508 |

FOREIGN PATENT DOCUMENTS 2326745  9/1976  France ............................ 73/862.19

OTHER PUBLICATIONS

J. D. Hurley, "Torsional Monitor Equipment for Turbine-Generator Units", vol. 41, Proceedsing of the American Power Conference, 1979, pp. 1163–1169.

Primary Examiner—Errol A. Krass
Assistant Examiner—Kevin J. Teska
Attorney, Agent, or Firm—Sughrue, Mion, Zinn, Macpeak & Seas

[57] ABSTRACT

First and second devices (8,9) measure the speed of rotation at two widely separated points H and J along a line of shafts, e.g. through a turboalternator unit. Parameters representative of the opposing torque are determined by a third device which is responsive to signals derived from said measured speeds and to a signal representative of the travel of a controlling servomotor (7). Apparatus are provided that determine the torsion damage suffered, if any, on the basis of the signals provided by said first, second and third devices. The system avoids the prior art need to use expensive, high-current transformers, and can also provide more accurate measurement of damage suffered.

1 Claim, 39 Drawing Figures

SYSTEM FOR MONITORING TORSION DAMAGE TO A COMPOSITE LINE OF SHAPES THROUGH A DRIVING MACHINE AND A DRIVEN MACHINE

FIELD OF THE INVENTION

The present invention relates to a system for monitoring torsion damage to a composite line of shafts passing through a driving machine and a driven machine (eg. through a turboalternator unit), and in which the driven machine is controlled via a servomotor.

BACKGROUND OF THE INVENTION

Damaging torques can be imposed on turboalternators by severe system disturbances. These can result in oscillations in the line of shafts having sufficient amplitude to cause mechanical fatigue, and since fatigue is cumulative, it is essential to keep track of the damage suffered in various zones of the line of shafts.

One such a system is described in the article about a line of shafts entitled "Torsional Monitor Equipment For Turbo-Generator Units" in the American journal "Proceedings of the American Power Conference, 1979, vol. 41, pp. 1163 to 1169". This system includes a device for measuring the opposing torque, which device is in the form of a current transformer and a voltage transformer applying output signals to an analog computer.

However, such special transformers are expensive since they are required to pass very high currents without distortion, and furthermore, they provide inaccurate measurements since they are incapable of taking account of non-linear phenomena between the rotor and the stator of the alternator.

The monitoring system of the present invention uses less expensive means and can provide a more accurate result.

SUMMARY OF THE INVENTION

The present invention provides a system for monitoring torsion damage to a composite line of shafts through a driving machine and a driven machine, said driven machine being controlled by a servomotor, said system including first and second devices providing signals $V_H$ and $V_J$ representative of the speeds of rotation at two widely separated points H and J along the line of shafts, a third device determining parameters of the opposing torque, means using the signals provided by the first, second and third devices to determine the values of stresses in various zones M of the line of shafts, and means responsive to said stress values to determine metal damage in said zones M, the improvement wherein the device determining the parameters of the opposing torque comprises:

first means responsive to the signals $V_H$ and $V_J$ to provide a signal $\Delta\phi_T(t)$ representative of the angle of twist between the points H and J;

second means supplied with the signal $\Delta\phi_T(t)$ and with a signal $dL(t)/dt$ which is the derivative of a signal $L(t)$ proportional to the travel of the servomotor to provide a signal $\Delta\phi_m(t)$ representative of the portion of the angle of twist due to the driving torque;

third means serving to take the difference between the signal $\Delta\phi_T(t)$ and the signal $\Delta\phi_m(t)$ to provide a signal $\Delta\phi(t)$ representative of the twist angle due to the opposing torque;

fourth means responsive to the signal $\Delta\phi(t)$ to provide the parameters of the opposing torque;

a first threshold device supplied with the signal $d\Delta\phi_T(t)/dt$ to trigger the second means when said signal exceeds a given threshold; and a second threshold device supplied with the signal $dL(t)/dt$ to trigger the second means when said signal exceeds a given threshold.

BRIEF DESCRIPTION OF THE DRAWINGS

An embodiment of the invention is described by way of example with reference to the accompanying drawings, in which.

DETAILED DESCRIPTION OF THE INVENTION

Figure 1:
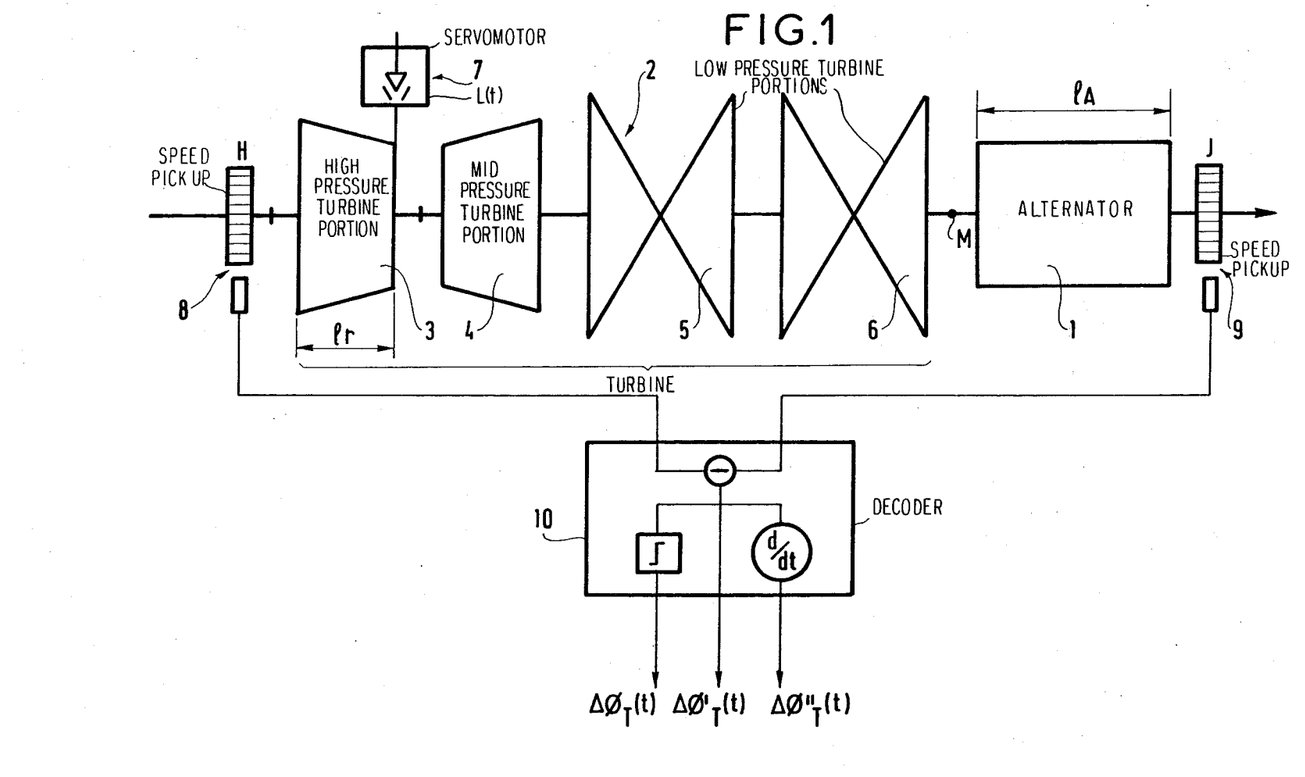
FIG. 1 shows a line of shafts fitted with first means providing a signal $\Delta\phi_T(t)$ representative of the angle of twist between the points H and J.

FIG. 1 is a diagram of a line of shafts in a turboalternator which comprises an alternator 1, a turbine 2 including a high pressure (HP) portion 3, a mid pressure (MP) portion 4 and two low pressure (LP) portions 5 and 6.

The HP or header portion 3 is fed with fluid under pressure via an adjustable valve actuated by a servomotor 7 whose travel as a function of time is noted L(t). The position of the servomotor is varied to control the performance of the alternator.

A first instantaneous speed pickup 8 is disposed ahead of the HP portion 3 at a point H and a second instantaneous speed pickup 9 is disposed behind the alternator 1 at a point J.

The pickups 8 and 9 provide output signals which are applied to a decoder 10 which provides a signal $\Delta\phi_T(t)$ representative of the instantaneous angle of twist between the points H and J, and signals $\Delta\phi_T'(t)$ and $\Delta\phi_T''(t)$ respectively representative of the difference in speed and the difference in acceleration between H and J.

Figure 2:
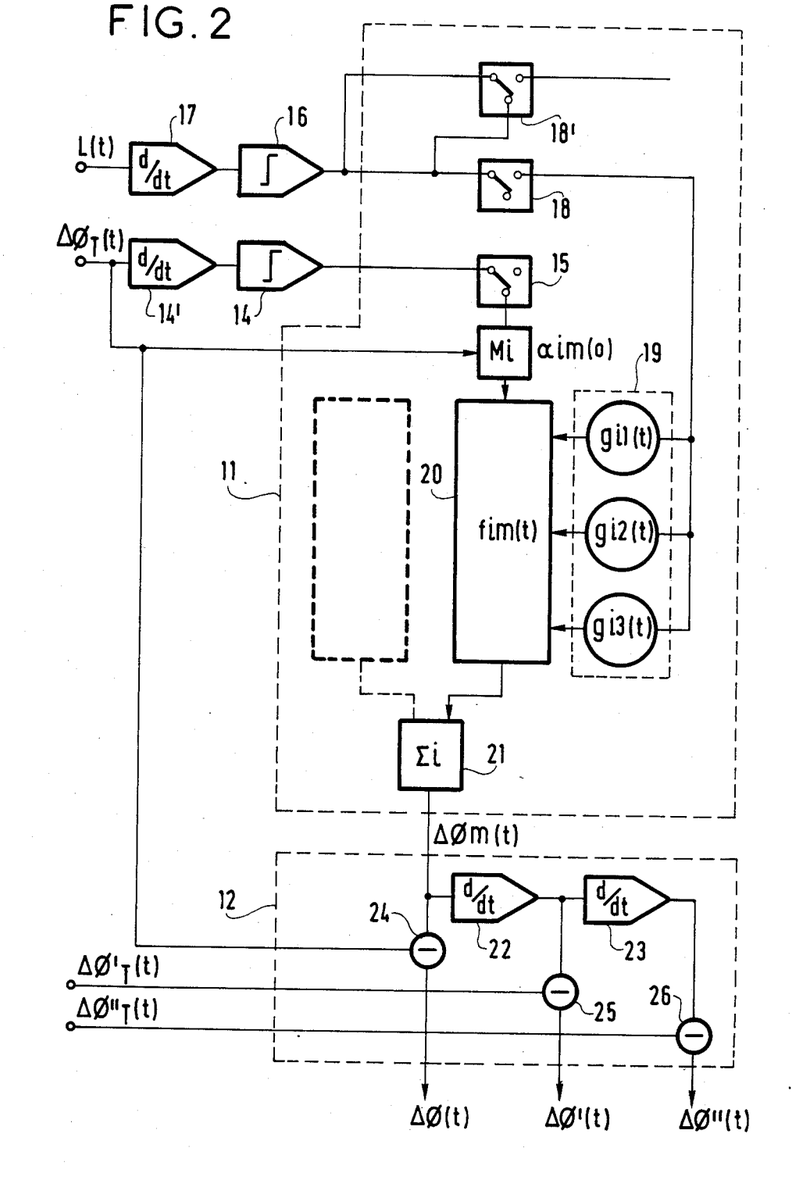
FIG. 2 shows means providing the signal $\Delta\phi_m(t)$ representative of the portion of the angle of twist due to the driving torque and the signal $\Delta\phi(t)$ representative of the portion of the angle of twist due to the opposing torque.

FIG. 2 shows second means 11 which provide a signal $\Delta\phi_m(t)$ representative of the difference in angle between H and J due to the driving torque, and third means 12 which provide a signal $\Delta\phi(t)$ representative of the difference in angle between H and J due to the opposing torque.

FIG. 2 also shows a differentiator 14' which is supplied with the signal $\Delta\phi_T(t)$ and which supplies the signal $d\Delta\phi_T(t)/dt$ to a first threshold device 14. When this signal exceeds a given threshold, the device 14 operates a switch 15 to actuate w blocks Mi (where $1 \leq i \leq w$) to calculate $\alpha_{im}(0)$ where w is the number of resonant modes in the line of shafts taken into account, eg. about ten. The blocks Mi together with the switch 15 constitute a part of the second means 11.

The blocks Mi receive the signal $\Delta\phi_T(t)$ continuously, but they make use only of the signal $\Delta\phi_T(0)$, where the instant 0 is the instant the switch 15 is operated. There is a fixed linear relationship between $\tilde{C}_m^r(0)$ and $\Delta\phi_T(0)$, and the coefficients of this relationship are stored in the blocks Mi.

The formula for $\alpha_{im}(0)$ is as follows:

$$\alpha_{im}(0) = \sum_r \overline{C_m^r}(0) \beta_i^r$$

where:

$$\beta_i^r = \frac{\Delta\phi}{\omega_i^* I_T} \int_{l_r} \frac{\phi_i(z)}{l_r} dz$$

where:
Cu = reference torque
$I_T$ = calculated moment of inertia for the complete line of shafts
r = index of the driving rotor under consideration
$l_r$ = active length of the rotor r
$\phi_i(z)$ = resonant mode i
z = distance along the line of shafts from the point H
$\Delta\phi_i$ = angle of twist between the points H and J as calculated for mode i $C_m^r(0)$ = the driving torque existing on rotor r before the instant $t_0$ at which the threshold device 14 activates the memories Mi. This torque is given once only as a function of the permanent value $\Delta\phi_T(0)$ between the two measuring tracks. This torque is given in terms of the reference torque.
$\omega_i^* = \omega_i\sqrt{1-v_i^2}$ where: $\omega_i$ is angular frequency of order i in conservative, and $v_i$ is the Lehr damping corresponding to mode i and is experimentally determined. In particular, $v_i$ includes damping due to the driving fluid.

FIG. 2 also shows a second threshold device 16 which is supplied with the signal dL(t)/dt from a differentiator 17 which itself receives a signal L(t) representative of the travel of the servomotor 7.

The second means 11 further include a switch 18 and a switch 18' which are operated by the threshold circuit 16 when the signal dL(t)/dt exceeds a predetermined threshold. The instant at which the signal dL(t)/dt exceeds the threshold is noted $t_1$, a certain length of time after $t_1$ the servomotor is stopped and the instant it stops is noted $t_2$. The travel of the servomotor at instant $t_2$ is noted $L_2$, and the instant 0 is, as mentioned above, the instant at which $d\Delta\phi_T(t)/dt$ exceeds its predetermined threshold.

The switch 18 activates w function generator groups 19 which constitute a part of the second means 11.

Each group 19 comprises function generators $g_{i1}(t)$, $g_{i2}(t)$, and $g_{i3}(t)$. The second means further include w blocks 20 for generating a function $f_{im}(t)$. Each of the blocks 20 is supplied with the signal dL(t)/dt obtained from the output of the differentiator 17, and with signals from the associated group of function generators 19. The signal dL(t)/dt is applied to the blocks 20 only when the switch 18' is operated.

These functions are as follows:

$$g_{i1}(t) = \frac{\omega_i^* t}{\omega_i^{*2} + n_i^2} - \frac{2\omega_i^* n_i}{(\omega_i^{*2} + n_i^2)^2} +$$

-continued $$\frac{(n_i^2 - \omega_i^{*2})^2 \sin\omega_i^* \bar{t} + 2n_i\omega_i^* \cos\omega_i^* \bar{t}}{(\omega_i^{*2} + n_i^2)^2} e^{-n_i\bar{t}}$$

$$g_{i2}(\bar{t}) = \frac{\omega_i^* \bar{t} e^{-k_0 \bar{t}}}{\omega_i^{*2} + (n_i - k_0)^2} - \frac{2\omega_i^*(n_i - k_0)e^{-k_0 \bar{t}}}{(\omega_i^{*2} + (n_i - k_0)^2)^2} +$$

$$\frac{((n_i - k_0)^2 - \omega_i^{*2})\sin\omega_i^* \bar{t} + 2(n_i - k_0)\omega_i^* \cos\omega_i^* \bar{t}}{(\omega_i^{*2} + (n_i - k_0)^2)^2} e^{-n_i\bar{t}}$$

$$g_{i3}(\bar{t}) = \frac{\omega_i^{*2}}{\omega_i^{*2} + n_i^2} - \frac{\omega_i^*}{\omega_i^{*2} + (n_i - k_0)^2} e^{-k_0 \bar{t}} e^{-k_0(t_2 - t_1)} -$$

$$\frac{n_i \sin\omega_i^* \bar{t} + \omega_i^* \cos\omega_i^* \bar{t}}{\omega_i^{*2} + n_i^2} e^{-n_i\bar{t}} +$$

$$\frac{(n_i - k_0)\sin\omega_i^* \bar{t} + \omega_i^* \cos\omega_i^* \bar{t}}{\omega_i^{*2} + (n_i - k_0)^2} e^{-n_i\bar{t}} e^{-k_0(t_2 - t_1)}$$

where:

$$f_{im}(t) = -\alpha_{im}(o) \frac{a}{L_o} (g_{i1}(\bar{t}) - g_{i2}(\bar{t})) \text{ if } 0 < t < t_2$$

$$= f_{im}(t_2) - i_m(o)\left(1 - \frac{L_2}{L_o}\right) g_{i3}(\bar{t}) \text{ if } t > t_2$$

with $a = (dL(t)/dt)_t = 0$
$L_o$ = servomotor travel associated with torques $C_m{}^r(o)$
with $\bar{t} = t - t_1$ in $g_{i1}$ and $g_{i2}$
and $\bar{t} = t - t_2$ in $g_{i3}$
$n_i = \omega_i \cdot v_i$
$k_o$ = transient driving torque damping constant determined experimentally.

The outputs from the blocks 20 are connected to inputs of a summing circuit 21 which performs the signal sum:

$$\sum_i f_{im}(t)$$

to supply a signal $\Delta\phi_m(t)$ which is representative of the difference in angle of twist between the two tracks H and J due to the driving torque.

Two differentiators 22 and 23 provide the signals $\Delta\phi_m'(t)$ and $\Delta\phi_m''(t)$.

The third means 12 include three subtractors 24, 25, and 26. The subtractor 24 takes the difference between the signals $\Delta\phi_T(t)$ and $\Delta\phi_m(t)$ to provide a signal $\Delta\phi(t)$ representative of the difference in angle between the two tracks H and J due to the opposing torque, where:

$$\Delta\phi(t) = \Delta\phi_T(t) - \Delta\phi_m(t)$$

Likewise the subtractors 25 and 26 provide signals:

$$\Delta\phi'(t) = \Delta\phi_T'(t) - \Delta\phi_m'(t);$$

and $$\Delta\phi''(t) = \Delta\phi_T''(t) - \Delta\phi_m''(t)$$

Figure 3:
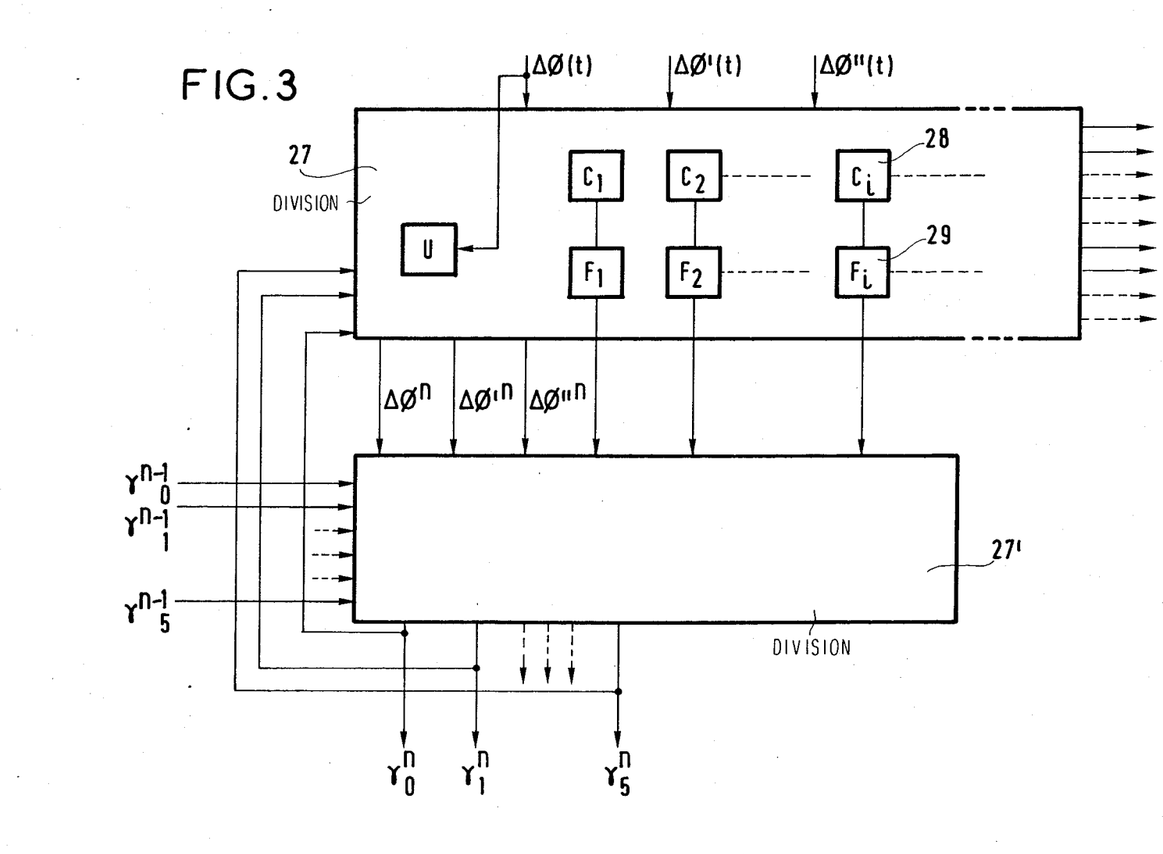
FIG. 3 shows means for calculating the parameters representative of the opposing torque.

The fourth means 13 shown in FIG. 3 serve to calculate the electrical torque by using the mode base of the line of shafts. The mode base is established by testing and by calculation. In the chosen method, Cr is represented by a set of polynomials of degree 5.

$$\sum_k \gamma_k^n v^k,$$

with $0 \leq k \leq 5$, and v representing time between $t_{n-1}$ and $t_n$, time being divided into equal slices u with $t_n - t_{n-1} = u$, n with $0 \leq v \leq u$ and $v^k$ representing successive powers of v: 1, v, $v^2$, $v^3$, $v^4$, $v^5$.

The first division 27 of the fourth means 13 provides discrete values for the functions $\Delta\phi(t)$, $\Delta\phi'(t)$, $\Delta\phi''(t)$ and calculates the functions of the resonant mode characteristics.

The calculation increment u and the following constants for each resonant mode of order i (shown as a block 28 marked $C_i$) are defined once and for all after adjustments performed in situ:

$\omega_i$, $v_i$, $n_i$, $p_{i1}$, $q_{i1}$
$a_{i1}{}^u$, $a_{i2}{}^u$, $c_{i1}{}^u$, $c_{i2}{}^u$, $\beta_i$ as mentioned above u represents the time interval over which each of the successive expressions of the opposing torque is valid.

$\omega_i$, $v_i$, and $n_i$ have already been defined $$p_{i1} = \frac{n_i}{\omega_i^{*2} + n_i^2}$$

$$q_{i1} = \frac{\omega_i^*}{\omega_i^{*2} + n_i^2}$$

$$a_{i1}^u = e^{-n_i u} \sin\omega_i^* u$$

$$a_{i2}^u = e^{-n_i u} \cos\omega_i^* u$$

$$c_{i1}^u = e^{+n_i u} \cos\omega_i^* u$$

$$c_{i2}^u = -e^{+n_i u} \sin\omega_i^* u$$

$$\beta_i = \Delta\phi_i \frac{Cu}{\omega_i^* I_T} \int_{l_A} \frac{\Delta\phi_i(z)}{l_A} dz$$

with $l_A$ being the active length of the rotor over which the opposing torque is exerted.

The division 27 includes w generators 29 of functions $F_i$.

Each function generator 29 is constituted by eighteen blocks (B1) numbered 1 to 18.

Figure 6:
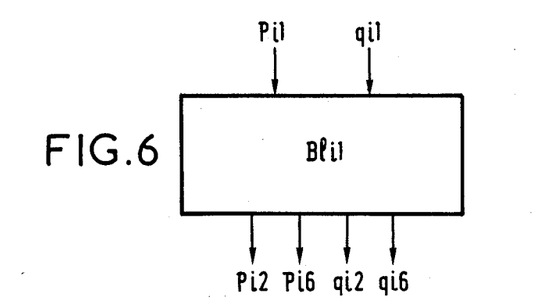
FIG. 6 illustrates a circuit for calculating the constants $P_{i2}$ to $P_{i6}$ and $q_{i2}$ to $q_{i6}$.

The block 1 ($Bl_i$) shown in FIG. 6 calculates the constants $p_{i2}$ to $p_{i6}$ and $q_{i2}$ to $q_{i6}$ as functions of $p_{i1}$ and $q_{i1}$ from the following formulae:

$$p_{i2} = p_{i1}^2 - q_{i1}^2$$

$$p_{i3} = p_{i1}p_{i2} - q_{i1}q_{i2}$$

$$p_{i6} = p_{i1}p_{i5} - q_{i1}q_{i5}$$

$$q_{i2} = 2p_{i1}q_{i1}$$

$$q_{i3} = q_{i1}p_{i2} + p_{i1}q_{i2}$$

$$q_{i6} = q_{i1}p_{i5} + p_{i1}q_{i5}$$

Figure 7:
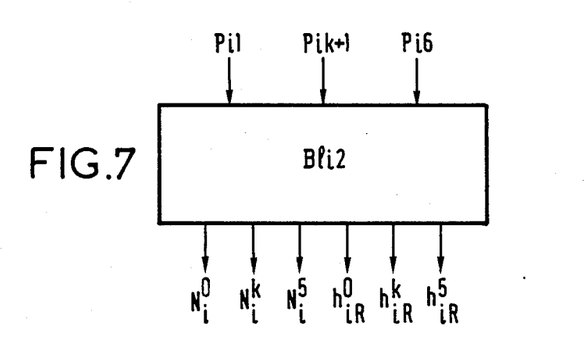
FIG. 7 illustrates a circuit for calculating the constants $n^k$ and $h_{iR}^k$.

The constants $N^k$ and $h_{iR}{}^k$ are calculated by the block 2 ($Bl_{i2}$) shown in FIG. 7, using the following formulae in which the R in the index of $h_i^k$ means the real part and k is an integer in the range 0 to 5:

$$N_i^0 = p_{i1}$$

$$N_i^1 = p_{i1} \cdot u - p_{i2}$$

$$N_i^2 = p_{i1} \cdot u^2 - 2 \cdot p_{i2} \cdot u + 2! \cdot p_{i3}$$

$$N_i^5 = p_{i1} \cdot u^5 - 5 \cdot p_{i2} \cdot u^4 + 4 \cdot 5 \cdot p_{i3} \cdot u^3 -$$
$$3 \cdot 4 \cdot 5 \cdot p_{i4} \cdot u^2 + 2 \cdot 3 \cdot 4 \cdot 5 \cdot p_{i5} \cdot u - 5! \cdot p_{i6}$$

where $u$, $u^2$, $u^3$, $u^4$, and $u^5$ represent successive powers of u both in these formulae and in the following formulae.

$$h_{iR}^k = -(-1)^{k+1} \cdot k! \cdot p_{i,k+1}$$

Figure 8:
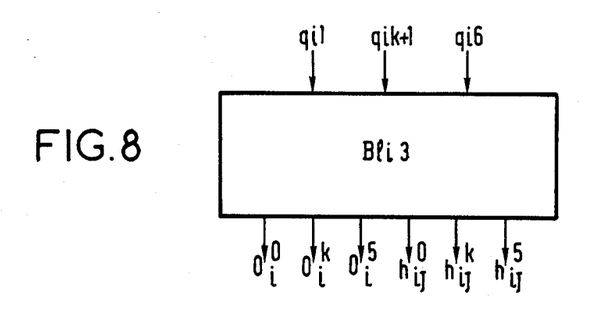
FIG. 8 illustrates a circuit for calculating the constants $o_i^k$ and $h_{iJ}^k$.

The constants $0_i^k$ and $h_{iJ}^k$ (where J in the index of $h_i^k$ means the imaginary part) are calculated by the block 3 ($Bl_{i3}$) shown in FIG. 8 using formulae which are the same as those used in block $Bl_{i2}$ except that the following substitutions are made:

$q_{i,k+1}$ for $p_{i,k+1}$
$0_i^k$ for $N_i^k$
$h_{iJ}^k$ for $h_{iR}^k$

Figure 9:
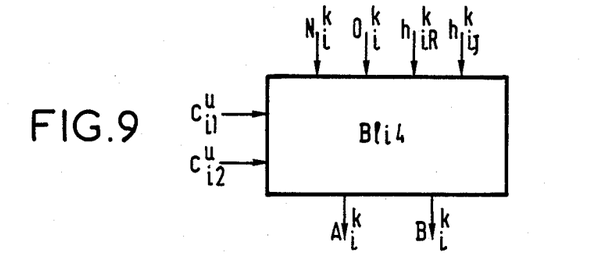
FIG. 9 illustrates a circuit for calculating the constants $A_i^k$ and $B_i^k$.

The constants $A_i^k$ and $B_i^k$ are calculated by the block 4 ($Bl_{i4}$) shown in FIG. 9 using the following formulae:

$$A_i^k = h_{iR}^k + N_i^k \cdot c_{i1}^u - O_i^k \cdot c_{i2}^u$$

$$B_i^k = h_{iJ}^k + N_i^k \cdot c_{i2}^u + O_i^k \cdot c_{i1}^u$$

Figure 10:
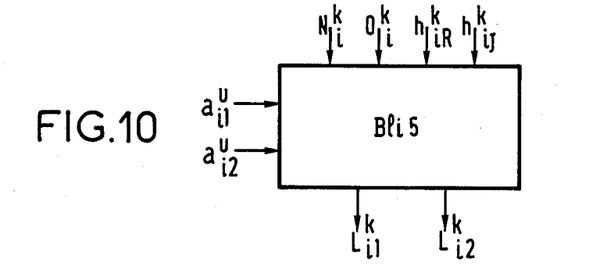
FIG. 10 illustrates a circuit for calculating the constants $L_{i1}^k$ and $L_{i2}^k$.

The constants $L_{i1}^k$ and $L_{i2}^k$ are calculated by the block 5 ($Bl_{i5}$) shown in FIG. 10 using the following formulae:

$$L_{i1}^k = A_i^k \cdot a_{i1}^u + B_i^k \cdot a_{i2}^u$$

$$L_{i2}^k = A_i^k \cdot a_{i2}^u - B_i^k \cdot a_{i1}^u$$

Figure 11:
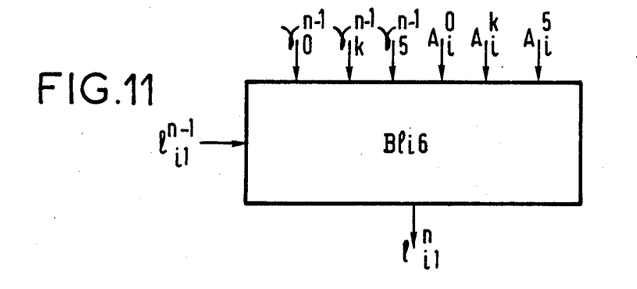
FIG. 11 illustrates a circuit for generating a function $l_{i1}^n$.

The function $l_{i1}^n$ is calculated as a function of $l_{i1}^{n-1}$ and the coefficients $\gamma_k^{n-1}$ by the block 6 ($Bl_{i6}$) shown in FIG. 11, where:

n is an index which varies from 0 to infinity $$l_{i1}^n = l_{i1}^{n-1} + \sum_k A_i^k \cdot \gamma_k^{n-1}$$

with $l_{i1}^0 = 0$

Figure 12:
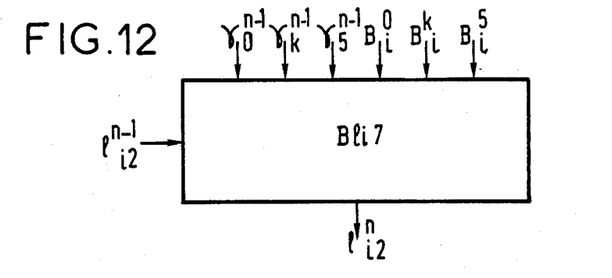
FIG. 12 illustrates a circuit for generating a function $l_{i2}^n$.

The function $l_{i2}^n$ is calculated by the block 6 ($Bl_{i6}$) shown in FIG. 12, using the following formula:

$$l_{i2}^n = l_{i2}^{n-1} + \sum_k B_i^k \cdot \gamma_k^{n-1}$$

with $l_{i2}^0 = 0$

Figure 13:
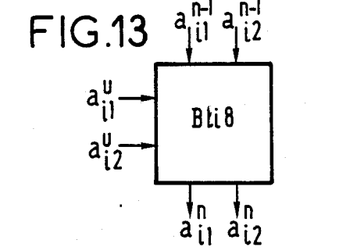
FIG. 13 illustrates a circuit for calculating the constants $a_{i1}^n$ and $a_{i2}^n$.

The constants $a_{i1}^n$ and $a_{i2}^n$ are calculated by the block 8 ($Bl_{i8}$) shown in FIG. 13, using the following formulae:

$$a_{i1}^n = a_{i1}^u \cdot a_{i1}^{n-1} + a_{i2}^u \cdot a_{i1}^{n-1}$$

$$a_{i2}^n = a_{i2}^u \cdot a_{i1}^{n-1} - a_{i1}^u \cdot a_{i2}^{n-1}$$

with $a_{i1}^0 = 0$ and $a_{i2}^0 = 1$

Figure 14:
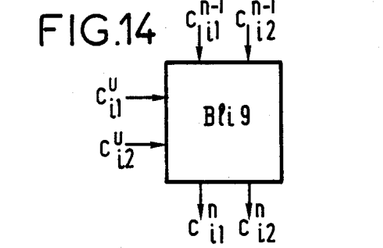
FIG. 14 illustrates a circuit for calculating the constants $c_{i1}^n$ and $c_{i2}^n$.

The constants $c_{i1}^n$ and $c_{i2}^n$ are calculated by the block 9 ($Bl_{i9}$) shown in FIG. 14, using the following formulae:

$$c_{i1}^n = c_{i1}^u \cdot c_{i1}^n - c_{i2}^u \cdot c_{i2}^n$$

$$c_{i2}^n = c_{i1}^u \cdot c_{i2}^n + c_{i2}^u \cdot c_{i1}^n$$

with $c_{i1}^0 = 1$ and $c_{i2}^0 = 0$

Figure 15:
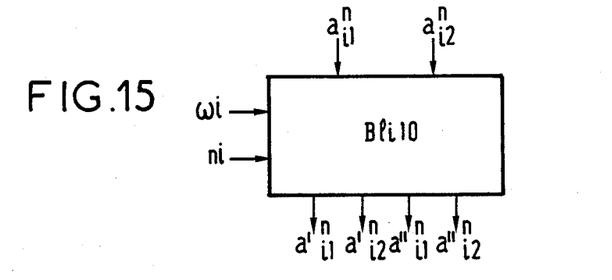
FIG. 15 illustrates a circuit for calculating the constants $a'_{i1}^n$, $a'_{i2}^n$, $a''_{i1}^n$, and $a''_{i2}^n$.

The constants $a'_{i1}{}^n$, $a'_{i2}{}^n$, $a''_{i1}{}^n$, and $a''_{i2}{}^n$ are calculated by the block 10 ($Bl_{i10}$) shown in FIG. 15, using the following formulae:

$$a'_{i1}{}^n = \omega_i^* \cdot a_{i2}^n - n_i \cdot a_{i1}^n$$

$$a'_{i2}{}^n = -(\omega_i^* \cdot a_{i1}^n + n_i \cdot a_{i2}^n)$$

$$a''_{i1}{}^n = \omega_i^* \cdot a'_{i2}{}^n - n_i \cdot a'_{i1}{}^n$$

$$a''_{i2}{}^n = -(\omega_i^* \cdot a'_{i1}{}^n + n_i \cdot a'_{i2}{}^n)$$

Figure 16:
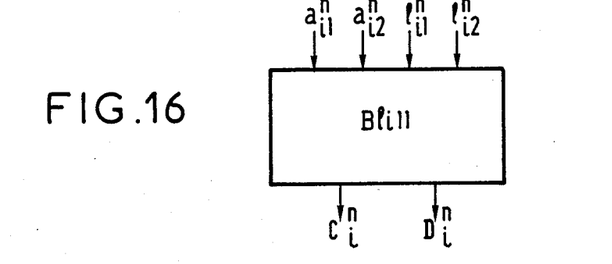
FIG. 16 illustrates a circuit for generating the functions $C_i^n$ and $D_i^n$.

The functions $C_i^n$ and $D_i^n$ are calculated by the block 11 ($Bl_{i11}$) shown in FIG. 16, using the following formulae:

$$C_i^n = l_{i1}^n \cdot a_{i2}^n - l_{i2}^n \cdot a_{i1}^n$$

$$D_i^n = l_{i1}^n \cdot a_{i1}^n + l_{i2}^n \cdot a_{i2}^n$$

Figure 17:
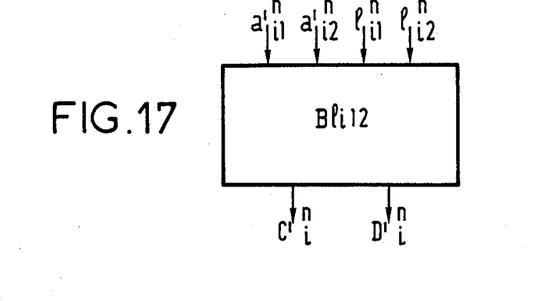
FIG. 17 illustrates a circuit for generating the functions $C'_i^n$ and $D'_i^n$.
Figure 18:
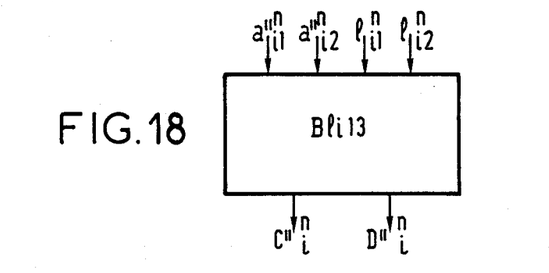
FIG. 18 illustrates a circuit for generating the functions $C''_i^n$ and $D''_i^n$.
Figure 19:
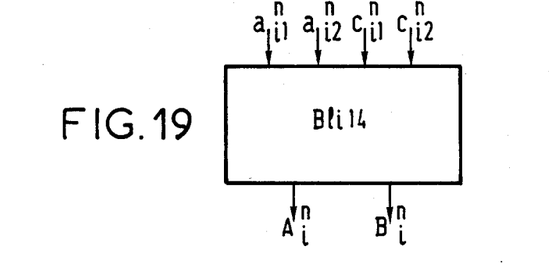
FIG. 19 illustrates a circuit for calculating the constants $A_i^n$ and $B_i^n$.

The functions $C'_i{}^n$ and $D'_i{}^n$ are calculated by the block 12 ($Bl_{i12}$) shown in FIG. 17, using the formulae for block $Bl_{i11}$ except that the following substitutions are made:

for $C_i^n$ put $C'_i{}^n$
for $D_i^n$ put $D'_i{}^n$
for $a_{i1}^n$ put $a'_{i1}{}^n$
for $a_{i2}^n$ put $a'_{i2}{}^n$ The functions $C''_i{}^n$ and $D''_i{}^n$ are calculated by the block 13 ($Bl_{i13}$) shown in FIG. 18, using the formulae for block $Bl_{i11}$ except that the following substitutions are made:

for $C_i^n$ put $C''_i{}^n$
for $D_i^n$ put $D''_i{}^n$
for $a_{i1}^n$ put $a''_{i1}{}^n$
for $a_{i2}^n$ put $a''_{i2}{}^n$ The constants $A_i^n$ and $B_i^n$ are calculated by the block 14 ($Bl_{i14}$) shown in FIG. 19, using the following formulae:

$$A_i^n = c_{i1}^n \cdot a_{i1}^n + c_{i2}^n \cdot a_{i2}^n$$

$$B_i^n = c_{i1}^n \cdot a_{i2}^n - c_{i2}^n \cdot a_{i1}^n$$

Figure 20:
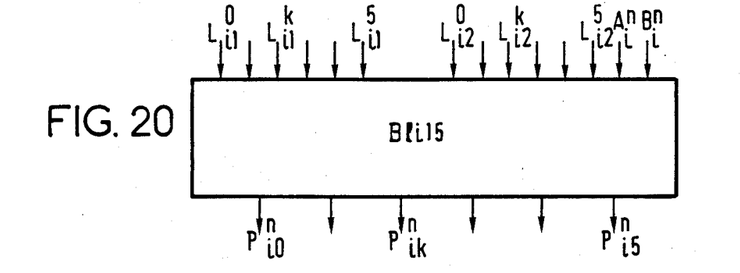
FIG. 20 illustrates a circuit for generating the functions $P_{ik}^n$.

Functions $p_{ik}^n$ are calculated by the block 15 ($Bl_{i15}$) shown in FIG. 20, using the following formula:

$$P_{ik}^n = \beta_i \cdot (A_i^n \cdot L_{i2}^k + B_i^n \cdot L_{i1}^k)$$

Figure 21:
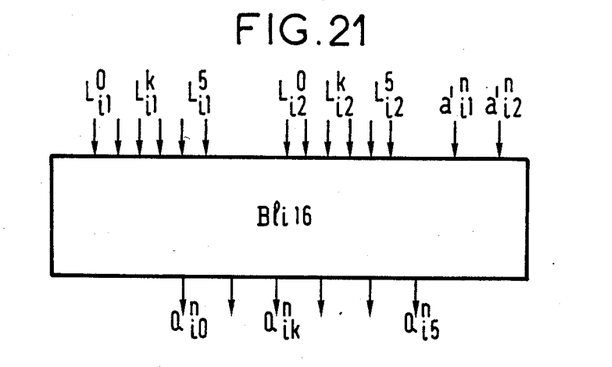
FIG. 21 illustrates a circuit for generating the functions $Q_{ik}^n$.

Functions $Q_{ik}^n$ are calculated by the block 16 ($Bl_{i16}$) shown in FIG. 21, using the following formula:

$$Q_{ik}^n = \beta_i \cdot (a'_{i1}{}^n \cdot L_{i2}^k + a'_{i2}{}^n \cdot L_{i1}^k)$$

Figure 22:
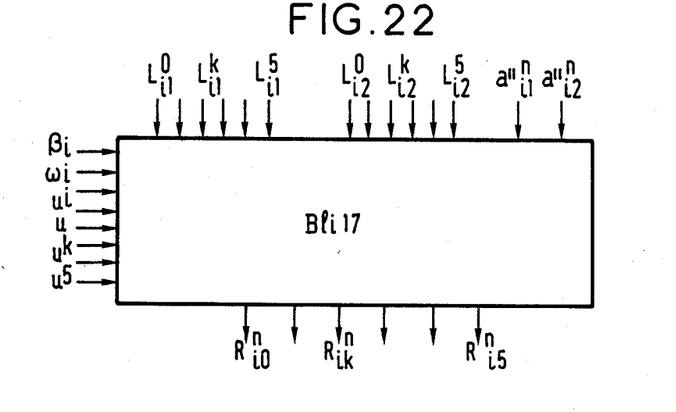
FIG. 22 illustrates a circuit for generating the functions $R_{ik}^n$.

Functions $R_{ik}^n$ are calculated by the block 17 ($Bl_{i17}$) shown in FIG. 22, using the following formula:

$$R_{ik}^n = \beta_i \cdot (a''_{i1}{}^n \cdot L_{i2}^k + a''_{i2}{}^n \cdot L_{i1}^k + \omega_i^* \cdot u^k)$$

Figure 23:
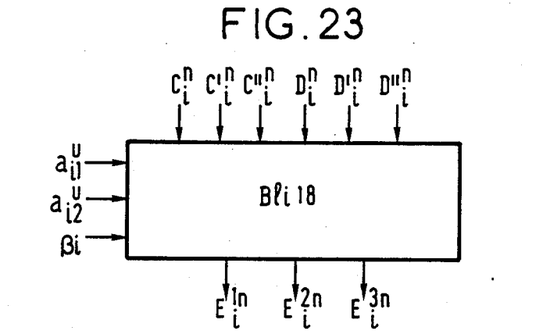
FIG. 23 illustrates a circuit for generating the functions $E_i^{1n}$, $E_i^{2n}$, $E_i^{3n}$.

Functions $E_i^{1n}$, $E_i^{2n}$, $E_i^{3n}$, are calculated by the block 18 ($Bl_{i18}$) shown in FIG. 23, using the following formulae:

$$E_i^{1n} = \beta_i \cdot (a_{i1}^u \cdot C_i^n + a_{i2}^u \cdot D_i^n)$$

$$E_i^{2n} = \beta_i \cdot (a_{i1}^u \cdot C_i'^n + a_{i2}^u \cdot D_i'^n)$$

$$E_i^{3n} = \beta_i \cdot (a_{i1}^u \cdot C_i''^n + a_{i2}^u \cdot D_i''^n)$$

The division 27 is supplied with the signals $\gamma_0^{n-1}$ to $\gamma_5^{n-1}$ representative of the opposing torque during time interval n (ie. between $t_{n-1}$ and $t_n$).

The division 27 includes means supplied with the functions $\Delta\phi(t)$, $\Delta\phi'(t)$, and $\Delta\phi''(t)$ and which supply sequences of discrete values $\Delta\phi^n(t)$, $\Delta\phi'^n(t)$, and $\Delta\phi''^n(t)$ representative of these functions at instant $t_n$, with $\Delta\phi^n(t)=\Delta\phi(t_n)$, $\Delta\phi'^n(t)=\Delta\phi'(t_n)$, and $\Delta\phi''^n(t)=\Delta\phi''(t_n)$.

The division 27' receives the signals from the division 27 and it also receives the signals $\gamma_0^{n-1}$ to $\gamma_5^{n-1}$ representative of the electrical torque during the interval $n-1$, and serves to calculate signals $\gamma_0^n$ to $\gamma_5^n$ representative of the opposing torque during interval n.

Figure 24:
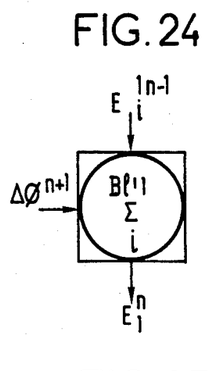
FIG. 24 illustrates a circuit for generating a signal $E_1^n$.
Figure 25:
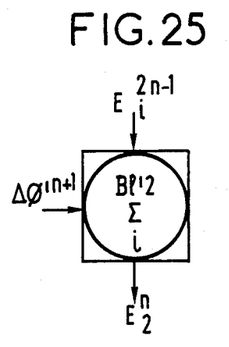
FIG. 25 illustrates a circuit for generating a signal $E_2^n$.
Figure 26:
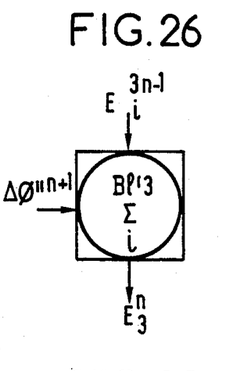
FIG. 26 illustrates a circuit for generating a signal $E_3^n$.

The division 27' includes 11 blocks numbered Bl'1 to Bl'11. The block Bl'1 shown in FIG. 24 receives the signal $\Delta\phi^{n+1}$, and the w signals $E_i^{1n-1}$, and supplies a signal $E_i^n$ using the following formula:

$$E_1^n = \Delta\phi^{n+1} - \sum_i E_i^{1, n-1}$$

the block Bl'2 (FIG. 25) supplies a signal $E_2^n$ using the formula:

$$E_2^n = \Delta\phi'^{n+1} - \sum_i E_i^{2, n-1} \text{ and}$$

the block Bl'3 (FIG. 26) supplies a signal $E_3^n$ using the formula:

$$E_3^n = \Delta\phi''^{n+1} - \sum_i E_i^{3, n-1}$$

Figure 27:
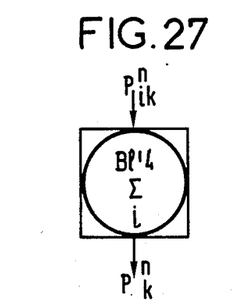
FIG. 27 illustrates a circuit for generating signals $P_k^n$.
Figure 28:
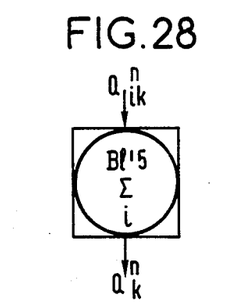
FIG. 28 illustrates a circuit for generating signals $Q_k^n$.
Figure 29:
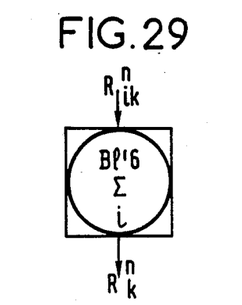
FIG. 29 illustrates a circuit for generating signals $R_k^n$.

The block Bl'4 (FIG. 27) provides signals $P_k^n$, where:

$$P_k^n = \sum_i P_{ik}^n \text{ with } 0 \leq k \leq 5,$$

the block Bl'5 (FIG. 28) provides signals $Q_k^n$, where:

$$Q_k^n = \sum_i Q_{ik}^n \text{ and}$$

the block Bl'6 (FIG. 29) provides signals $R_k^n$, where:

$$R_k^n = \sum_i R_{ik}^n$$

Figure 30:
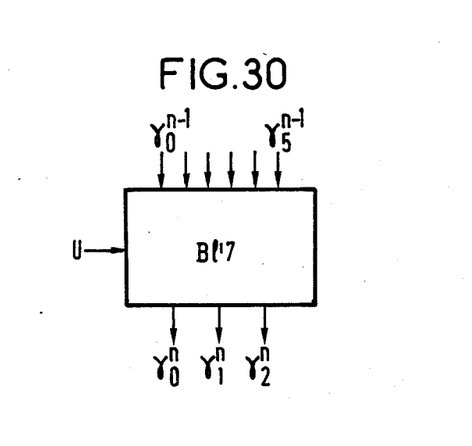
FIG. 30 illustrates a circuit for generating signals $\gamma_O^n$, $\gamma_O^n$, and $\gamma_O^n$.

The block Bl'7 (FIG. 30) calculates the signals $\gamma_0^n$, $\gamma_0^n$, and $\gamma_0^n$ using the following formulae:

$$\gamma_0^n = \gamma_0^{n-1} + u \cdot \gamma_1^{n-1} + u^2 \cdot \gamma_2^{n-1} + u^3 \cdot \gamma_3^{n-1} + u^4 \cdot \gamma_4^{n-1} + u^5 \cdot \gamma_5^{n-1}$$

$$\gamma_1^n = \gamma_1^{n-1} + 2u \cdot \gamma_2^{n-1} + 3u^2 \cdot \gamma_3^{n-1} + 4u^3 \cdot \gamma_4^{n-1} + 5u^4 \cdot \gamma_5^{n-1}$$

$$\gamma_2^n = \gamma_2^{n-1} + 3u \cdot \gamma_3^{n-1} + 6u^2 \cdot \gamma_4^{n-1} + 10u^3 \cdot \gamma_5^{n-1}$$

Figure 31:
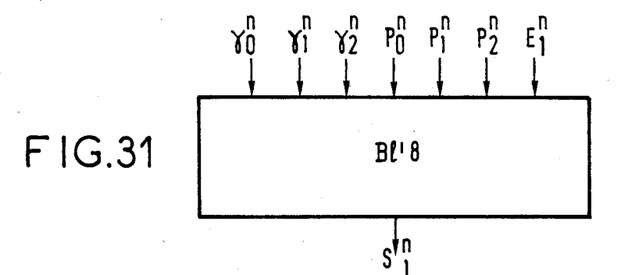
FIG. 31 illustrates a circuit for generating a signal $S_1^n$.

The block Bl'8 (FIG. 31) calculates the signal $S_1^n$ using the following formula:

$$S_1^n = E_1^n - P_0^n\gamma_0^n - P_1^n\gamma_1^n - P_2^n\gamma_2^n$$

Figure 32:
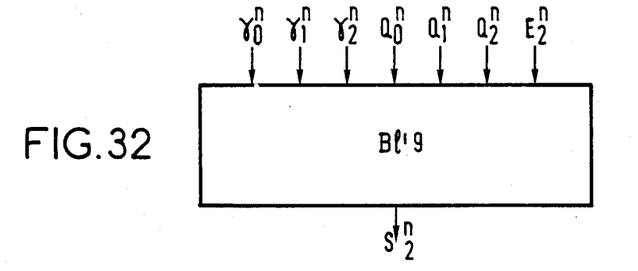
FIG. 32 illustrates a circuit for generating a signal $S_2^n$.

The block Bl'9 (FIG. 32) calculates the signal $S_2^n$ using the following formula:

$$S_2^n = E_2^n - Q_0^n\gamma_0^n - Q_1^n\gamma_1^n - Q_2^n\gamma_2^n$$

Figure 33:
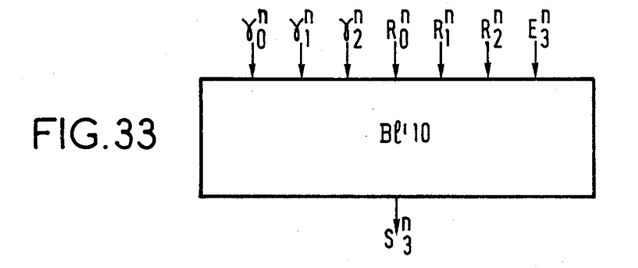
FIG. 33 illustrates a circuit for generating a signal $S_3^n$.

The block Bl'10 (FIG. 33) calculates the signal $S_3^n$ using the following formula:

$$S_3^n = E_3^n - R_0^n\gamma_0^n - R_1^n\gamma_1^n - R_2^n\gamma_2^n$$

Figure 34:
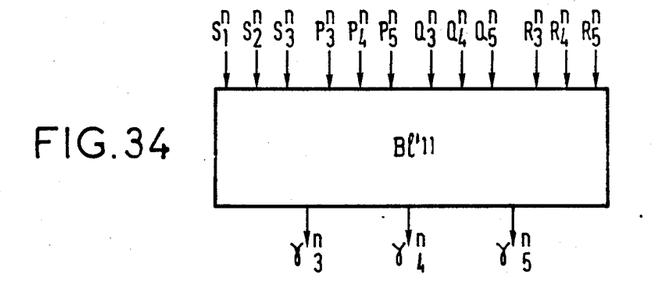
FIG. 34 illustrates a circuit for generating signals $\gamma_3^n$, $\gamma_4^n$, and $\gamma_5^n$.

The block Bl'11 (FIG. 34) calculates the signals $\gamma_3^n$, $\gamma_4^n$, and $\gamma_5^n$ using the formulae:

$$\gamma_3^n = \frac{S_1^n(Q_4^n \cdot R_5^n - R_4^n \cdot Q_5^n) + S_2^n(R_4^n \cdot P_5^n - P_4^n \cdot R_5^n) + S_3^n(P_4^n \cdot Q_5^n - Q_4^n \cdot P_5^n)}{\Delta^n}$$

$$\gamma_4^n = \frac{S_1^n(R_3^n \cdot Q_5^n - Q_3^n \cdot R_5^n) + S_2^n(P_3^n \cdot R_5^n - R_3^n \cdot P_5^n) + S_3^n(Q_3^n \cdot P_5^n - P_3^n \cdot Q_5^n)}{\Delta^n}$$

$$\gamma_5^n = \frac{S_1^n(Q_3^n \cdot R_4^n - R_3^n \cdot Q_4^n) + S_2^n(R_3^n \cdot P_4^n - P_3^n \cdot R_4^n) + S_3^n(P_3^n \cdot Q_4^n - Q_3^n \cdot P_4^n)}{\Delta^n}$$

where:

$$\Delta^n = P_3^n \cdot Q_4^n \cdot R_5^n + Q_3^n \cdot R_4^n \cdot P_5^n + R_3^n \cdot P_4^n \cdot Q_5^n - R_3^n \cdot Q_4^n \cdot P_5^n - Q_3^n \cdot P_4^n \cdot R_5^n - P_3^n \cdot R_4^n \cdot Q_5^n$$

The starting coefficients $\gamma_1^0$, $\gamma_2^0$, and $\gamma_3^0$ are obtained from the three formulae above by putting n=0 and by diminishing the lower index of the terms in $\gamma$, P, Q, and R by two.

$\gamma_4^0$ and $\gamma_5^0$ are taken to be zero.

Finally $\gamma_0^0$ is taken to be equal to $$\frac{\Delta\phi''(0)}{\sum_i \beta_i \omega_i^*}$$

The opposing torque

The opposing torque $\sum_k \gamma_k^n v^k$ may be used by monitoring equipment such as described in French patent specification FR-B-No. 7629133 or in the above-mentioned article "Torsional monitor equipment for turbo-generator units". Alternatively, means 30 may be used for determining stress values, as described with reference to FIG. 4.

Figure 4:
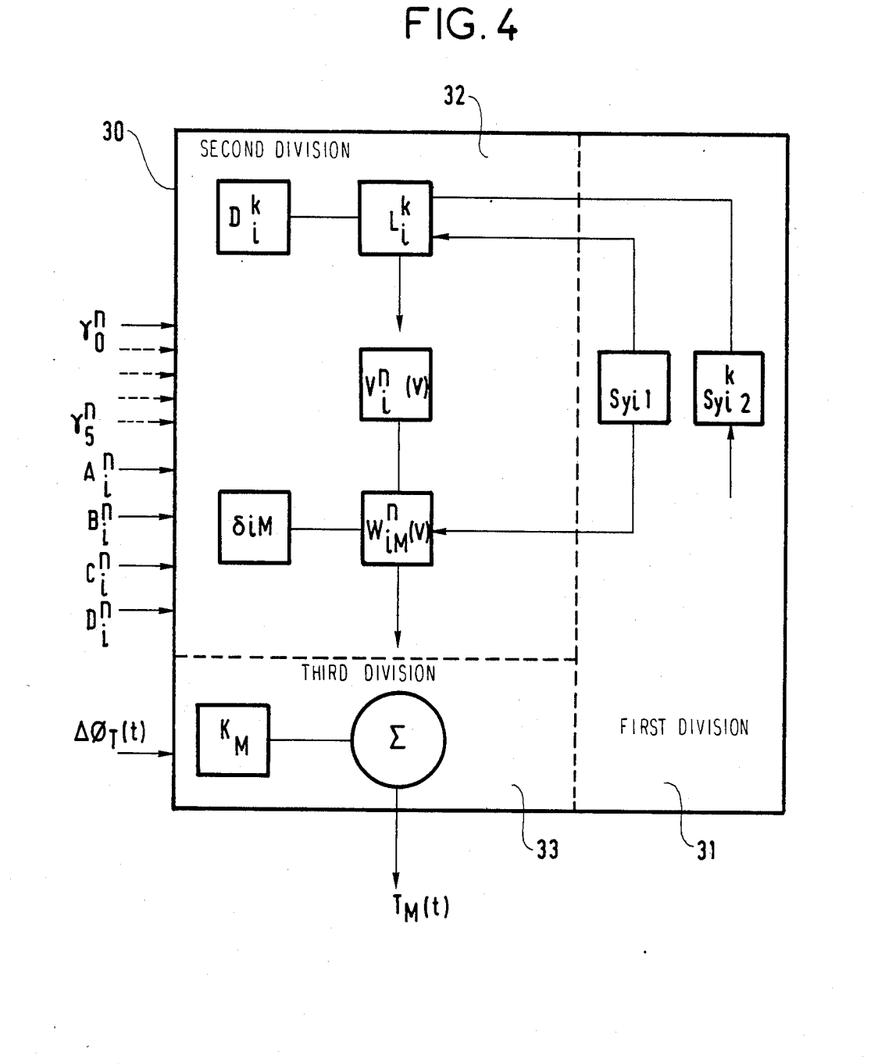
FIG. 4 shows means for calculating the torsion stresses in a zone M of the rotor.

The means 30 use the results from the division 27' together with some of the magnitudes provided by the division 27.

Functions $S_{y1}$ and $S_{y2}^k$ are synthesized in a first division 31 of the means 30.

The synthesizer $S_{y1}$ provides functions $a_{i1}(v)$ and $a_{i2}(v)$ $a_{i1}(v)$ and $a_{i2}(v)$ have the same expressions as $a_{i1}^u$ and $a_{i2}^u$ but in which u is replaced by v.

v represents time, with $0 \leq v \leq u$ 10 w functions $N_i^k(v)$ and $O_i^k(v)$ are provided by the synthesizers $S_{y2}$, and similarly they replace u by v, but in the expressions $N_i^k$ and $O_i^k$, with $0 \leq v \leq u$ These functions are independent of the index n.

Figure 35:
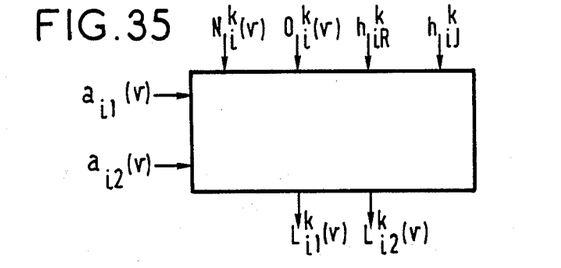
FIG. 35 illustrates a circuit for generating the functions $L_{i1}^k(v)$ and $L_{i2}^k(v)$.

Functions $L_{i1}^k(v)$ and $L_{i2}^k(v)$ are generated by a second division 32 of the means 30 by means of a block shown in FIG. 35, in which:

$$L_{i1}^k(v) = O_i^k(v) + h_{iJ}^k \cdot a_{i2}(v) + h_{iR}^k \cdot a_{i1}(v) \text{ and}$$

$$L_{i2}^k(v) = N_i^k(v) - h_{iJ}^k \cdot a_{i1}(v) + h_{iR}^k \cdot a_{i2}(v)$$

Figure 36:
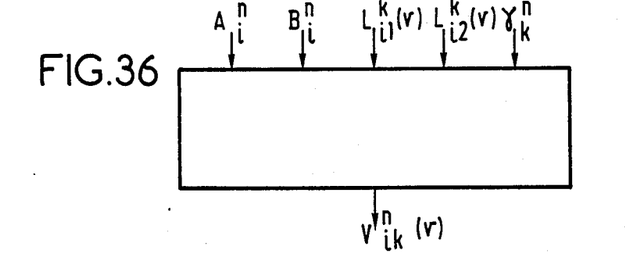
FIG. 36 illustrates a circuit for generating the functions $V_{ik}^n(v)$.

Functions $V_{ik}^n(v)$ are also generated in this second division 32 by means of a block shown in FIG. 36, in which:

$$V_{ik}^n(v) = \gamma_k^n [B_i^n \cdot L_{i1}^k(v) + A_i^n \cdot L_{i2}^k(v)]$$

Figures 37, 38, 39:
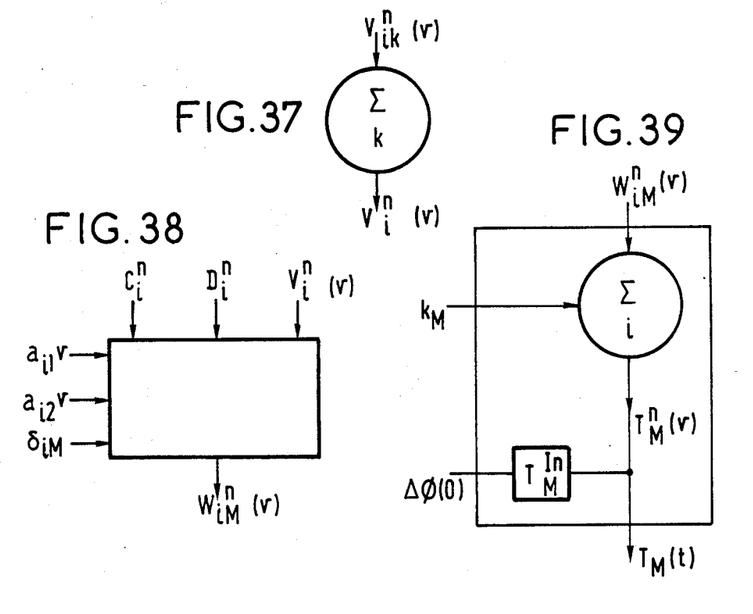
FIG. 37 illustrates a circuit for generating a function $V_i^n(v)$.
FIG. 38 illustrates a circuit for generating a function $W_{iM}^n(v)$.
FIG. 39 illustrates a circuit for generating a function $T_M(t)$.

The sum of the six functions $V_{ik}^n(v)$ is performed by a block shown in FIG. 37 and providing:

$$V_i^n(v) = \sum_k V_{ik}^n(v)$$

The division 32 includes a block (FIG. 38) which provides the function:

$$W_{iM}^n(v) = [V_i^n(v) + a_{i1}(v) \cdot C_i^n + a_{i2}(v) \cdot D_i^n]\delta_{iM}$$

where $\delta_{iM} = \dfrac{\beta_i}{\Delta \phi_i} \left( \dfrac{d\phi_i}{dz} \right)_M$ This function $W_{iM}^n(v)$ is the contribution of the resonant mode i to the torsion stress at point M.

The means 30 include a third division 33 which determines the value of the torsion stress at each point M.

It includes a block (FIG. 39) which provides the function:

$$T_M^n(v) = K_M \sum_i W_i^n(v)$$

where:
$K_M = \frac{1}{2} D_M \cdot G_M \cdot k_M$
$D_M$ is the diameter of the rotor at point M
$G_M$ is the shear modulus, and
$k_M$ is the contraction coefficient at M.

Further, $T_M^{In} = J_M \Delta \phi(0)$ is determined by the block shown in FIG. 39 which receives the signal $\Delta \phi(0)$, and where the term $J_M$ is a coefficient depending on the point M, the index In meaning that it exists with instant 0.

The output from this block provides the signal:

$$T_M(t) = T_M^{In} + T_M^n(v)$$

in which n takes all values from zero to infinity, and in which the signal is representative of the stress behaviour in the zone M as a function of time.

Figure 5:
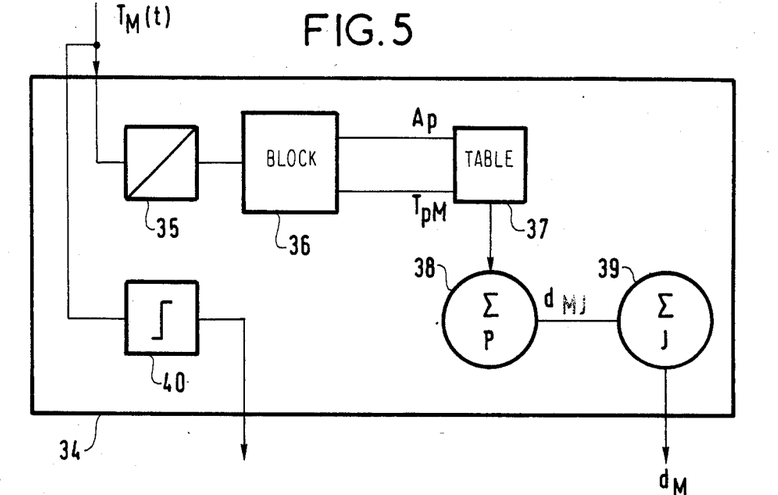
FIG. 5 shows fifth means for calculating the damage suffered by the rotor in the zone M under consideration.

FIG. 5 shows means 34 for deriving the damage to the metal in the zones M on the basis of the stress behaviour $T_M(t)$ in said zones.

The sixth division serves to calculate the damage produced at each point M by the transient behaviour of $T_M(t)$.

It includes an analog-to-digital converter 35 which transforms the analog signal $T_M(t)$ into a digital signal.

The digital signal is supplied to a block 36 which determines a sequence of relative maxima and minima and thus enables a sequence of half cycles to be established in terms of their average values $T_{pM}$ and their amplitudes $A_p$.

These two magnitudes are compared with values held in a table 37 which supplies a magnitude representative of the damage suffered during each half cycle.

This damage is summed in a summing circuit 38 over the entire time corresponding to a torsion transient from its appearance at instant t=0.

The overall damage $d_{MJ}$ is applied to a summing circuit 39 which keeps track of the damage accumulated at the point M during the life of the machine, and supplies a magnitude $d_M$ representative thereof.

This division also includes a threshold device 40 for triggering the turbine-alternator unit when the function $T_M(t)$ reaches a predetermined value.

I claim:

1. A monitoring system for monitoring torsion damage, to a composite line of shafts passing through a driving machine and a driven machine, said driven machine being controlled by a servomotor, said monitoring system including first and second devices providing signals $V_H$ and $V_J$ representative of the speeds of rotation at two widely separated points H and J along the line of shafts, a third device determining parameters of the opposing torque, means using the signals provided by the first, second and third devices to determine the values of stresses in various zones M of the line of shafts, and means responsive to said stress values to determine metal damage in said zones m, the improvement wherein said third device for determining the parameters of the opposing torque comprises:

first means responsive to the signals $V_H$ and $V_J$ for providing a signal $\Delta \phi_T(t)$ representative of the angle of twist between the points H and J;

second means supplied with the signal $\Delta \phi_T(t)$ and with a signal dL(t)/dt, which is the derivative of a signal L(t) proportional to the travel of the servomotor, for providing a signal $\Delta \phi_m(t)$ representative of the portion of the angle of twist due to the driving torque;

third means for taking the difference between the signal $\Delta \phi_T(t)$ and the signal $\Delta \phi_m(t)$ and for providing a signal $\Delta \phi(t)$ for providing parameters of the opposing torque;

a first threshold device supplied with the signal $d\Delta \phi_T(t)/dt$ to trigger said second means when said signal exceeds a given threshold; and a second threshold device supplied with the signal dL(t)/dt to trigger the second means when said signal exceeds a given threshold.

* * * * *